United States Patent [19]

Wiesenberger et al.

[11] Patent Number: 4,867,997
[45] Date of Patent: Sep. 19, 1989

[54] PROCESS FOR PRODUCING ALCOHOL-REDUCED OR ALCOHOL-FREE BEVERAGES MADE BY NATURAL FERMENTATION

[75] Inventors: Alfred Wiesenberger, Wiesbaden, Fed. Rep. of Germany; Rolf Marr, Graz, Austria; Erich Kolb, Neider-Olm, Fed. Rep. of Germany; Jens A. Schildmann, Partenheim, Fed. Rep. of Germany; Reinhard Weisrock, Nieder-Olm, Fed. Rep. of Germany

[73] Assignee: Peter Eckes KG MBH, Niederolm, Fed. Rep. of Germany

[21] Appl. No.: 940,138

[22] Filed: Dec. 10, 1986

[51] Int. Cl.[4] ............... A23L 2/00; B01D 3/10
[52] U.S. Cl. ................ 426/387; 426/493; 426/494; 426/592; 203/91; 203/99; 203/DIG. 13; 203/DIG. 19
[58] Field of Search ........ 203/DIG. 13, 91, DIG. 19, 203/99, 49, 2, DIG. 18; 426/592, 14, 493, 494, 387, 11; 202/205

[56] References Cited

U.S. PATENT DOCUMENTS

| 1,084,833 | 1/1914 | Wagner | 426/387 |
| 1,800,940 | 4/1931 | Heuser | 426/494 |
| 3,052,546 | 9/1962 | Riddell et al. | 426/493 |
| 4,265,920 | 5/1981 | Thissen | 426/14 |
| 4,626,437 | 12/1986 | Schobinger et al. | 426/493 |

FOREIGN PATENT DOCUMENTS

| 0489834 | 1/1977 | Australia. | |
| 0014340 | 8/1980 | European Pat. Off. | 426/14 |
| 0077745 | 4/1983 | European Pat. Off. | 426/14 |
| 377406 | 7/1920 | Fed. Rep. of Germany. | |
| 2505868 | 11/1982 | France | 426/14 |
| 82/02405 | 7/1982 | World Int. Prop. O. . | |

Primary Examiner—David L. Lacey
Assistant Examiner—V. Manoharan
Attorney, Agent, or Firm—Todd S. Parkhurst

[57] ABSTRACT

A process is described for preparing in particular alcohol-free wine in which by extraction with supercritical $CO_2$ firstly a specific aroma fraction with limited ethanol content is separated from the starting wine. The residual wine is then subjected to a vacuum distillation in which apart from the complete separation of the ethanol from the residual wine a fraction of more difficulty extractable aromatic substances not affected by the extraction is recovered which in the end together with the extract is added to the dealcoholized residual wine again to obtain an alcohol-free wine. The method permits an almost complete removal of the alcohol content without detrimentally affecting the basic wine and with retention of all the aromatic and flavoring substances characteristic of the wine.

9 Claims, 1 Drawing Sheet

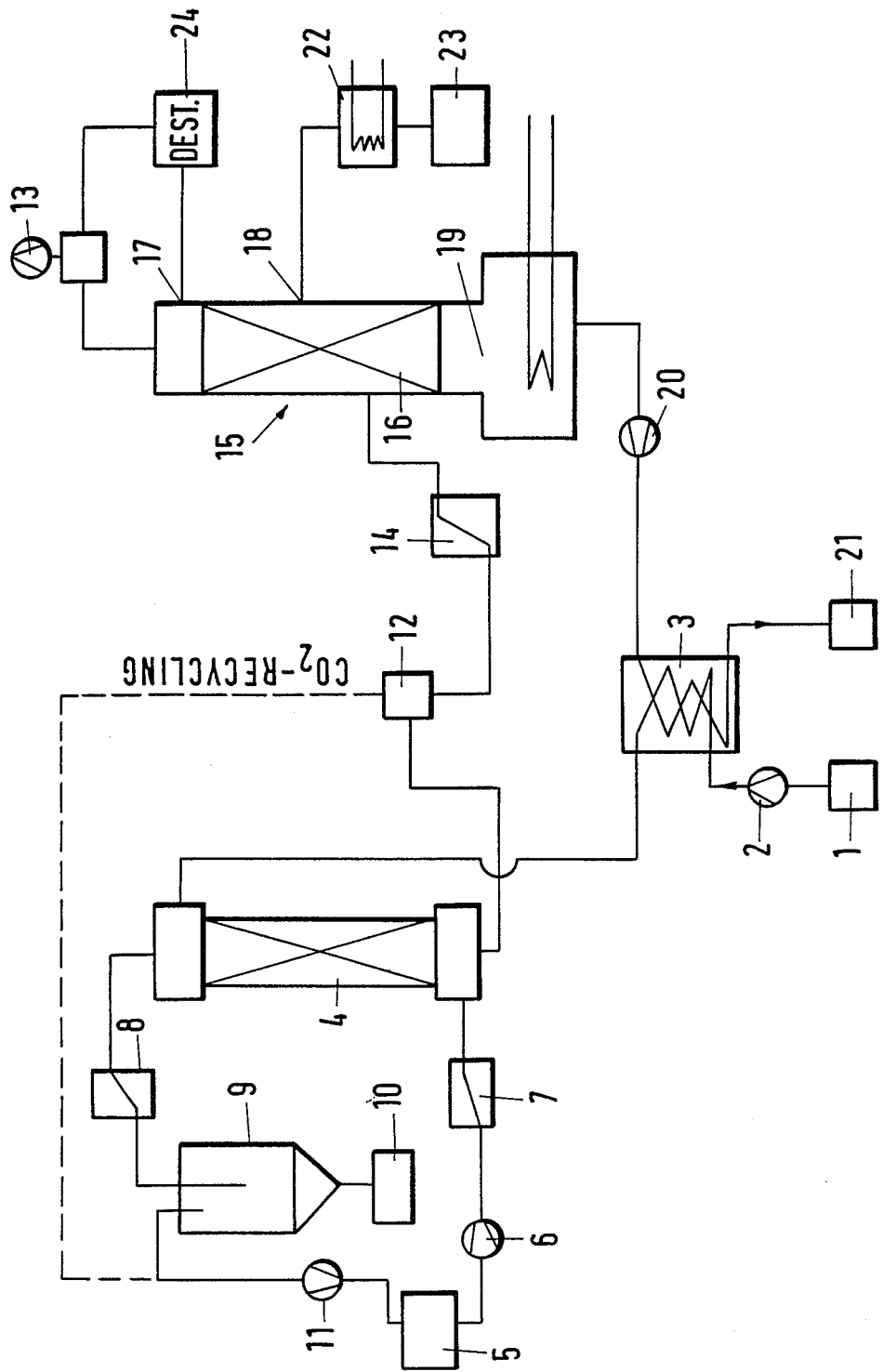

PROCESS FOR PRODUCING ALCOHOL-REDUCED OR ALCOHOL-FREE BEVERAGES MADE BY NATURAL FERMENTATION

The invention relates to a process for preparing alcohol-reduced and/or alcohol-free beverages from starting beverages obtained by natural alcoholic fermentation of fruits or corresponding plant parts, in particular for producing alcohol-reduced and/or alcohol-free wine, in which by high-pressure extraction with an inert gas, in particular by $CO_2$ high-pressure extraction, an alcoholic extract rich in aromatic substances is extracted from the starting beverage, the residual beverage reduced in its ethanol content and then the alcoholic extract rich in aromatic substances again added to the alcohol-reduced residual beverage.

The expression starting beverages obtained by natural alcoholic fermentation as used in this connection is intended to mean primarily alcoholic beverages such as wine, dessert wine, fruit wine, cider or the like. Beer for example may also be reckoned as one of these beverages but the process described here develops its particular advantages in conjunction with wine-like drinks because retaining the bouquet of the starting beverage is particularly important with drinks of this type.

There is a general need to make available wine beverages with reduced alcohol content or even alcohol-free wine beverages so that persons who must refrain from drinking alcoholic beverages, whether for health reasons or to avoid impairing their ability to drive motor vehicles, do not have to abandon the enjoyment of beverages having the desired flavor. The provisions of the law interpret the concept of an alcohol-free beverage to mean one containing less than 0.5 vol. % ethanol. The process described herein is aimed at producing beverages which fulfill this condition and are even appreciably lower in their ethanol content. It is important with a high quality product that the flavor and aromatic substances contained in the starting beverage are practically completely retained even after the dealcoholization. This objective is the more difficult the greater the degree of dealcoholization.

The literature, in particular protective right literature, already describes a great number of methods for reducing the alcohol content of beverages. The processes mainly employ distillation, extraction or membrane separation. Generally, only a certain reduction of the alcohol content is possible without problems because the selectivity present with incomplete separation of the ethanol suffices to leave an appreciable part of the aromatic and flavoring substances boiling close to ethanol in the beverage. However, as already mentioned the problems in this respect become greater the more complete the ethanol removal is to be made. As a result, a great variety of processes have also already been described for separating from the ethanol fraction the aromatic and flavoring substances initially separated together with the ethanol and then adding these substances to the starting beverage again, or for temporarily removing these aromatic substances from the beverage prior to the ethanol reduction in order likewise to add them again subsequently.

FR-OS 2,505,868 and EP-PS 0 077 745, and other earlier publications, already disclose extracting from beverages produced by natural alcoholic fermentation, such as wine, aromatic substances and ethanol by a high-pressure extraction with carbon dioxide. The two cited publications differ essentially only in that in the one case the operation is carried out with liquid carbon dioxide and in the other with carbon dioxide in the supercritical state. However, both publications already describe in detail a process of the aforementioned type from which the preamble of claim 1 proceeds. For from each of the publications at least one process variant is apparent in which by means of a first high-pressure extraction with a suitable gas an extract containing the essential aromatic substances is extracted from the beverage and is then added to the residual beverage again after the alcohol reduction thereof. The alcohol reduction by the methods previously described is then by a second extraction by means of the same gas.

Admittedly, this high-pressure extraction by means of carbon dioxide is an adequately careful process which in general does not damage the wine and the substances extracted from it; however, it is not selective enough for a high degree of intended dealcoholization.

As is known, the flavorings and aromas forming the bouquet and other such substances of a wine beverage include about 400 to 600 different substances, such as higher alcohols, esters, aldehydes, ketones, lactones, acids, etc., the total amount of which is only about 0.5 to 1 per mil of the wine volume and some of which are very volatile, their boiling points being in some cases above and in some cases below the boiling point of the ethanol. They also overlap appreciably the corresponding properties of ethanol as regards their extraction behavior. However, by means of the extraction conditions it is possible to obtain a certain selectivity of the extraction. These conditions include not only the pressure and temperature conditions but also the quantity ratio of extractant to beverage. Thus, although it is possible to extract in a first extraction stage in preferred manner part of the aromatic substances, the completer the intended extraction of the aromatic substances the more ethanol extracted and as a result on returning of the aroma extract to the residual beverage the alcohol content cannot be lowered below specific residual contents. If on the other hand in the first aroma extraction stage the extracted alcohol amount is restricted the aromatic and bouquet substances are in no way completely extracted and as a result a considerable proportion thereof goes into the second extract which is intended for the alcohol reduction alone.

In some respects more selective separation can be achieved by complicated distillation methods. A relatively complicated process of this type is already described in DE-PS 377,406. The distillation processes run the risk that the necessary action of heat on the starting beverage can impair the character of the latter. Moreover the, high expenditure is involved in dealing with and obtaining the bouquet substances boiling more readily than ethanol. In the process literature on the production of alcohol-reduced beverages there are obviously different opinions as regards whether mainly the aromatic and flavoring substances with high boiling points than ethanol or those with lower boiling points than ethanol are responsible for the nature of the beverage; however, if apart from the reduction removal of its alcohol content a beverage is to correspond identically to the starting beverage both fractions must be included as completely as possible.

Combined multi-stage processes have also already been proposed. Thus, WO-OS 82/02405 discloses a process for making beverages with low alcohol content in which firstly the constituents of high molecular weight are separated by a two-stage membrane separating method from the starting beverage in order to subject the latter to a vacuum distillation in which the ethanol is removed. The membrane separating methods subject the substances contained in the beverage to considerable mechanical stresses which in their turn can lead to damage. On the other hand, it is precisely the aromatic substances which boil at higher temperatures which are relatively insensitive to a distillation.

Finally, AU-PS 489,834 describes a process in which aromatic substances are removed by extraction by means of liquid carbon dioxide from raw wine before said wine is brought to the distillery for distilling off the alcohol. The purpose of this process is to remove at least a part of the valuable aromatic substances from the starting wine, which after distilling of the alcohol is then in any case discarded as waste product. These aromatic substances are then possibly to be added to other drinking wine to enhance the aroma. This method does not involve either removing the aromatic substances temporarily from the wine as commmpletely as possible or producing an alcohol-free wine beverage by the subsequent distillation and consequently the aspects involved here are completely ignored in the aforementioned process.

The invention is based on the problem of improving a process of the type mentioned at the beginning for making alcohol-reduced or alcohol-free beverages in such a manner that without excessively complicating the procedure on the one hand the bouquet and the other flavoring and aromatic substances of the starting beverage are practically completely retained and on the other hand however reduction of a dealcoholized wine beverage is possible whose ethanol content can be brought below 0.5 vol. %.

This problem is solved according to the invention by a method as disclosed herein.

For it has been found that with a not excessively intensive high-pressure extraction with carbon dioxide predominantly the bouquet substances can be separated from the starting wine, these being the substances which in other separating processes are liable to be damaged or lost. The extraction capability by means of carbon dioxide of the respective substances need not necessarily coincide with the distribution of their boiling points but subsequent sensorial tests have shown that by a limited extraction by means of carbon dioxide the bouquet substances are predominantly extracted. The extraction is preferably carried out in such a manner that the extract amount is only between 0.1 and at the most 0.6 vol. % of the starting beverage, the ethanol content of said extract lying below 80 vol. %. On executing this process step and maintaining the quantity ratios indicated the more readily and also the more difficulty volatile aromatic substances not only remain under $CO_2$ protection during the procedure but also subsequently remain under alcohol protection in the stored extract. The alcohol content of the extract of the controllable volume leaves the aromatic substances in their natural medium and ensures that for example water-insoluble fractions do not condense, thus being fully retained for the final product.

The extraction is preferably carried out in the supercritical range of the extraction gas, that is at temperatures between 35° and 45° C. and pressures between 75 and 200 bar. The quantity ratio between starting beverage and extractant is also an influencing factor in the extract fraction. Preferably, with one part by weight carbon dioxide 1.5 to 3 parts by weight starting beverage are extracted.

To keep the extracted amount of alcohol within limits the extraction is however not carried on to such an extent that the more difficultly volatile aromatic constituents boiling at higher temperatures than ethanol are extracted as completely as possible form the beverage. According to the invention, this aromatic fraction also somewhat less sensitive to temperature influences is extracted as completely as possible only in a subsequent distillation step. Due to the preceding extraction step however in the distillation it is not necessary to separate constituents boiling at lower boiling points than ethanol and consequently the ethanol fraction as head product of the rectifying column need not be separated any more.

The distillation is preferably carried out in a continuously operating rectifying column. The extracted residual beverage is added substantially in the lower third of the column, the dealcoholized residual beverage withdrawn continuously as bottom product, the ethanol fraction withdrawn at the head of the column and the intermediate fraction of higher boiling aromatic substances which remain in the beverage withdrawn substantially in the center of the column.

The vacuum-distillation is preferably carried out at pressures of less than 0.1 bar. In the distillation as well the highest temperature occurring in the heated bottom of the column should be between 35° and 40° C., i.e. if possible not exceed 45° C. to avoid damaging the basic beverage. In this manner in both stages of the process substantially the same maximum temperatures can be used.

A particular additional feature of the invention is the controlled withdrawal of the intermediate fraction from the column. The amount withdrawn should be controlled so that a continuous temperature profile is maintained along the column.

After starting operation of the column above the feed point for the residual beverage coming from the extraction a fraction arises with a maximum proportion of the aromatic substances still contained in the beverage. Amyl alcohols may be mentioned as relatively representative components of this fraction although they only represent part of the total fraction of higher boiling aromatic substances. As stated, after starting operation of the rectifying column the higher boiling aromatic fractions become more concentrated above the introduction point with increasing duration of the distillation. If the content of this fraction exceeds a critical value, which depending on the type of wine and operating conditions can be 30 to 60 vol. %, it causes a fluctuation in the temperature profile in the rectifying column which is due to these components forming with water heterogenic azeotropes lying beneath the boiling point of the respective pure components. By the increasing concentration of the aromatic components the composition of the returning mixture in the column also changes and as a result in the region of the entry point two immiscible liquid phases can form which then evaporate as heterogenic azeotrope with water corresponding to the particular boiling behavior. From this instant onwards via the entry point of the beverage the higher boiling aromatic fraction can and should be continuously withdrawn, the amount being limited so that the aforementioned temperature profile can be retained along the rectifying column. This teaching differs clearly from that according to DE-PS 377,406, according to which the higher boiling aromatic substances are to return within the column to the bottom.

Finally, to obtain the desired alcohol-free beverage the aromatic extract from the extraction stage and the intermediate fraction from the distillation stage are again added to the column bottom product withdrawn from the distillation column. Any volume losses which arise in carrying out the method can be compensated by appropriate adding of demineralized water to reestablish the concentration of the starting beverage. The alcohol-free beverage thus obtained can also be subjected to the usual subsequent treatments in the beverage industry. Thus, for example, in the production of alcohol-free wine the flavor thereof can be adjusted by adding so-called sweet reserves. The preservation steps possibly necessary are also to be carried out.

If by way of exception to obtain an extremely small ethanol content in the finished beverage and depending on the nature and character of the starting beverage the ethanol amount extracted with the aroma extract from the extraction stage is too large to keep to the required minimum alcohol content after adding the extract to the dealcoholized residual wine, the aroma extract itself can be subjected to a further extraction to remove from the extract a fraction containing substantially only ethanol. This ethanol fraction, which can also still contain a small proportion of aromatic substances, is then conveniently added to the residual wine prior to the distillation again in order to recover these residual aromatic substances.

Below the process according to the invention will be further explained with the aid of the process scheme shown in the drawings.

BRIEF DESCRIPTION OF THE DRAWING

The drawing is a schematic illustration of an embodiment of an apparatus arrangement designed to carry out the novel process described and claimed.

The starting beverage to be treated, for example w from a reservoir (1) is continuously brought with the aid of a corresponding pump (2), for example a diaphragm pump, to a pressure between 75 and 200 bar and after passing through a heat exchanger (3) in which the beverage is heated to a temperature between 35° and 45° C. is introduced into the upper part of a reactor (4). Supercritical liquid carbon dioxide at corresponding temperature and corresponding pressure is led in counterflow through the reactor (4). The carbon dioxide is withdrawn from a reservoir (5) and by means of a pump (6) brought to the necessary pressure and first passed through a heat exchanger (7) in which it is heated to a temperature between 35° and 45° C., then being pump in proportioned manner into the lower end of the reactor (4).

It has been found advantageous to use a reactor which consists of a slim column followed at the top and bottom by so-called settlers whose diameters are in the ratio of about 4:1 to 8:1 with respect to the diameter of the actual reactor column. This gives a better phase separation of carbon dioxide and wine. To ensure a more intensive mixing and thus also an accelerated substance interchange within the reactor column, the latter preferably contains mechanical or static mixer or also filling bodies. The reactor should advantageously be insulated with respect to the ambient temperature or even have its own temperature control means.

Whilst the wine is traversed from below by the supercritical carbon dioxide of lower specific weight, the $CO_2$ absorbs both the lower and also at least a part of the higher boiling aromatic substances and a small part of the ethanol. The $CO_2$ charged with these substances leaves the reactor (4) at its upper end and is conducted via a heat exchanger (8), in which a cooling to $-5°$ to $-10°$ C. takes place, to a separator (9) in which the mixture is expanded to 15 to 20 bar. In the resulting change of its aggregate state the carbon dioxide liberates the entrained substances which deposit as liquid alcoholic aroma concentrate on the bottom of the container (9) and from there pass to a collecting vessel (10). Of the original wine volume about 2 per mil is obtained as extract with 65 vol. % total alcohol. The cooled partially expanded $CO_2$ gas is returned via a compressor (11) to the reservoir (5) and thus to the extraction cycle.

The residual wine freed from the aroma extract leaves the reactor (4) at its lower end and is expanded and degassed in a container (12). From here the residual wine is sucked by the partial vacuum generated by a pump (13) at the head of the following rectifying column firstly through a heat exchanger (14), in which the residual wine is brought to a temperature of 22° to 25° C., into a vacuum distillation column (15) which is advantageously designed as alcohol rectifying column. In this continuously operating rectifying column the residual wine is introduced into said column (15) substantially in the lower third thereof at (16). In the rectifying column (15) the residual wine is broken down into three fractions, into an ethanol fraction, which is withdrawn at (17) at the head of the column, an aroma intermediate fraction which is withdrawn at (18) substantially in the center of the column, and a dealcoholized bottom product which collects in the heated bottom (19) of the column and is supplied by means of a pump (20) via the heat exchanger (3) to a collecting container (21). In the heat exchanger (3) the bottom product gives up part of its heat to the starting wine supplied to the extraction stage of the process. The aromatic intermediate fraction withdrawn at (18) from the rectifying column (15) is condensed in a condenser (22) and supplied to a collecting vessel (23).

To produce the finished dealcoholized beverage the bottom product from the container (21) the aroma extract from the container (10) and the aroma intermediate fraction from the container (23) are mixed together again.

For operation of the rectifying column (15) it may be advantageous to return a substantial proportion of the ethanol fraction removed at (17) and collected after condensation in a container (24) to the column again a so-called external reflux. The reflux ratio can for example be 5:1.

The rectifying column is preferably made from special steel and/or glass to avoid any harmful heavy metal ions getting into the product. The necessary column fittings should be chosen so that they result in the minimum possible pressure loss. With a correspondingly designed column a head product having more than 95 vol. % ethanol can be obtained and a bottom product with less than 0.1 vol. % ethanol. The amount of head product is about 12 to 15 vol. % of the starting wine used.

EXAMPLE OF EMBODIMENT

A reactor column of the type described above to be used for the extraction which is filled with Raschig rings of 10×10 mm, is brought to a pressure of 90 bar with temperature-controlled carbon dioxide. By means of a diaphragm metering pump wine heated to 35° is introduced into the upper end of the reactor in an amount of 10 to 12 liters per hour, said wine being of the type Mueller-Thurgau, Riesling, Morio-Muscat, Late Burgundy, Merlot or cider or fruit wine. In counterflow, with a second diaphragm metering pump carbon dioxide heated to 35° C. and compressed to a supercritical pressure of 90 bar is introduced into the lower end of the reactor column in an amount of about 6 kg/h.

Whilst the carrier gas of lower specific gravity rises in the reactor column it absorbs the aroma-forming substances of the wine of greater specific gravity flowing in the opposite direction from the top to the bottom. An intensive substance exchange is achieved by the Raschig rings present in the reactor column. The product flow leave the extraction column at opposite ends via throttle valves. With these throttle valves the column internal pressure is adjusted to a level of 90 bar.

The $CO_2$ charged with the aroma extract is expanded in a conically tapering separation container to 15 to 20 bar and thereby liberates the extract which collects in the cone of the separator. To protect the extract from turbulences by the gas flow and to provide an additional condensation area the separator is filled up to about half with wire coils of 5×5 mm. To avoid icing it is advisable to regulate the temperature of the gas and the container to about −5° C. Every hour about 25 ml waterclear highly aromatic extract of 65 vol. % total alcohol content collects and is discharged via a valve into a collecting vessel. The neutral gaseous $CO_2$ is sucked off with a diaphragm piston compressor and brought to the pressure of the $CO_2$ reservoir and returned to the latter.

The wine freed from the greater part of its aromatic substances is expanded in a degassing container free from fittings. The $CO_2$ thereby liberated, about 6 to 7% by weight of the gas amount introduced into the reactor, cools the wine to 25° to 28° C. by the effect of adiabatic decompression. For cost reasons it is not worthwhile to return this $CO_2$ component to the cycle.

In the following second process step from the residual wine by means of vacuum distillation the alcohol is distilled off. In addition a small fraction of difficulty volatile aroma constituents not affected by the extraction are separated off. A partial vacuum of 40 mbar is used in the distillation column. The extracted residual wine is introduced at a temperature of 25° C. between the so-called stripping section of the column and the so-called enriching section of the column into the latter substantially in the lower third thereof. The column filling is glass rings having dimensions of 5×5 mm. By heating the temperature of the column bottom is held at between 35° and 40° C. The head temperature is 14° to 16° C. The aromatic intermediate fraction is withdrawn at a temperature between 26° and 30° C. substantially in the center of the column, above the residual wine introduction. The condensed head product has an ethanol content of 96 vol. %. The ethanol content in the bottom product is less than 0.1 vol. %.

The volume flow of the aromatic intermediate fraction withdrawn as side stream depends on the residual content of aromatic substances after the extraction and should only be large enough to prevent impairing the constant temperature profile of the column in continuous operation.

From the bottom product, extract and aromatic intermediate fraction, after making up with 15 vol. % distilled water, an alcohol-free wine is prepared which except for the ethanol corresponds completely to the starting wine and a sensorial test of which shows that apart from the lack of ethanol therein it corresponds well to the starting wine.

The process described ensures that fundamentally the aromatic substances and alcohol-free residue, which are finally mixed together to form an end product, during the process are never subjected to temperatures higher than the maximum temperatures occurring naturally at the location of the plants. Thus, with the method a high quality alcohol-free product can be obtained which except for the properties typical of alcohol corresponds in its aroma and taste characteristics excellently to the starting product.

What is claimed is:

1. A process of preparing alcohol-reduced or alcohol-free beverages from starting beverages obtained by natural alcoholic fermentation by high-pressure extraction in the presence of carbon dioxide in the supercritical fluid state, the process comprising the steps of extracting an alcoholic extract rich in aromatic substances from the starting beverage, to thereby form a residual beverage being reduced in its ethanol content distilling, under reduced pressure in a rectifying column having a top and a bottom, the residual beverage so as to reduce further the ethanol content of the residual beverage, said distilling step including the steps of withdrawing an intermediate fraction, which consists substantially of substances having a higher boiling point than ethanol from the rectifying column at a point located between the top and the bottom of the rectifying column, withdrawing the further ethanol-reduced residual beverage from the bottom of the rectifying column; withdrawing an ethanol fraction from the top of the column, and thereafter adding the alcoholic extract rich in aromatic substances from the extraction and the intermediate fraction to the further ethanol-reduced residual beverage.

2. A process according to claim 1 including the step of extracting at temperatures between 35 and 45° C. and at pressures between 75 and 200 bar.

3. A process according to claim 1 including the step of providing carbon dioxide and starting beverage in the extraction in a ratio by weight of 1:1.5 and 1:3.

4. A process according to claim 1 including the step of withdrawing an extract amount of between 0.1 and 0.6 vol. % of the starting beverage, in which the ethanol content in the extract is less than 80 vol. %.

5. A process according to claim 1 including the step of distilling at a reduced pressure of less than 0.1 bar.

6. A process according to claim 5 including the steps of distilling at a pressure of about 40 mbar and maintaining the feed temperature at 22° to 25° C. and maintaining column bottom temperature by heating at 35° to 45° C., a head temperature of 14° to 16° C. thus arising.

7. A process according to claim 1 wherein said distillation process is carried out in a column having a plurality of trays sufficient to cause the bottom product to be brought to an ethanol content of less than 0.2 vol. %.

8. A process according to claim 1 including the steps of causing the column to reach a state of equilibrium and thereafter withdrawing the intermediate fraction in an amount such that a constant temperature profile is maintained in the column.

9. A process of preparing alcohol-reduced beverages from starting beverages obtained by natural alcoholic fermentation, the process comprising the steps of
pressurizing and heating the starting beverage,
introducing the pressurized and heated started beverage to the upper end of a vertically elongated extracting column,
introducing a super critical liquid carbon dioxide to the extracting column at a pressure and temperature to cause the carbon dioxide to absorb aromatic substances having low and high boiling points and an amount of alcohol,
withdrawing and cooling the carbon dioxide and aromatic substances from the extracting column, thereby leaving a residual beverage in the extracting column,
introducing the withdrawn carbon dioxide and aromatic substances in a separate vessel so as to separate liquid aromatic concentrates containing alcohol from the carbon dioxide,
withdrawing the residual beverage from the lower end of the extracting column,
depressurizing and cooling the withdrawn residual beverage,
introducing the depressurized and cooled residual beverage to the bottom of a vertically elongated rectifying column,
withdrawing an ethanol fraction from the top of the rectifying column,
withdrawing an aromatic residual beverage fraction from the center of the rectifying column,
withdrawing a dealcoholized residual beverage fraction from the bottom of the rectifying column,
and mixing the dealcoholized residual beverage fraction from the bottom of the rectifying column and the aromatic residual beverage fraction withdrawn from the center of the rectifying column with the liquid aromatic concentrates from the extracting column to produce a further dealcoholized residual beverage.

* * * * *